United States Patent
Acharya et al.

(10) Patent No.: US 7,046,728 B1
(45) Date of Patent: May 16, 2006

(54) METHOD OF VIDEO CODING THE MOVEMENT OF A HUMAN FACE FROM A SEQUENCE OF IMAGES

(75) Inventors: Tinku Acharya, Chandler, AZ (US); Somnath Sengupta, Kharagpur (IN); A. Rama Suryanarayana, Hyderabad (IN)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 09/608,989

(22) Filed: Jun. 30, 2000

(51) Int. Cl.
 *H04N 7/18* (2006.01)
(52) U.S. Cl. .............................. 375/240.08; 375/240.09
(58) Field of Classification Search ............ 348/17–20; 375/240.08, 240.09
See application file for complete search history.

(56) References Cited

U.S. PATENT DOCUMENTS

| | | | |
|---|---|---|---|
| 4,941,193 A | 7/1990 | Barnsley et al. | |
| 5,065,447 A | 11/1991 | Barnsley et al. | |
| 5,347,600 A | 9/1994 | Barnsley et al. | |
| 5,416,856 A | 5/1995 | Jacobs et al. | |
| 5,592,228 A * | 1/1997 | Dachiku et al. | 348/416.1 |
| 5,600,731 A | 2/1997 | Sezan et al. | |
| 5,724,451 A | 3/1998 | Shin et al. | |
| 5,740,282 A | 4/1998 | Hurd | |
| 5,778,098 A | 7/1998 | Lee et al. | |
| 5,832,115 A | 11/1998 | Rosenberg | |
| 5,862,262 A | 1/1999 | Jacobs et al. | |
| 5,867,221 A | 2/1999 | Pullen et al. | |
| 5,875,122 A | 2/1999 | Acharya | |
| 5,978,030 A | 11/1999 | Jung et al. | |
| 5,982,441 A | 11/1999 | Hurd et al. | |
| 5,995,210 A | 11/1999 | Acharya | |
| 6,009,201 A | 12/1999 | Acharya | |
| 6,009,206 A | 12/1999 | Acharya | |
| 6,009,210 A * | 12/1999 | Kang | 382/276 |
| 6,044,168 A | 3/2000 | Tuceryan et al. | |
| 6,047,303 A | 4/2000 | Acharya | |
| 6,091,851 A | 7/2000 | Acharya | |
| 6,094,508 A | 7/2000 | Acharya et al. | |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya et al. | |
| 6,154,493 A | 11/2000 | Acharya et al. | |
| 6,157,747 A * | 12/2000 | Szeliski et al. | 382/284 |
| 6,166,664 A | 12/2000 | Acharya | |
| 6,178,269 B1 | 1/2001 | Acharya | |
| 6,195,026 B1 | 2/2001 | Acharya | |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |

(Continued)

OTHER PUBLICATIONS

Shih-Ping Liou, "Model Based Motion Estimation Using Constrained Weighted Least Squares", Imaging Department, Siemens Corporation Research, Princeton, NJ, 1994 IEEE, pp. 810-814.

(Continued)

*Primary Examiner*—Andy Rao
(74) *Attorney, Agent, or Firm*—Sharon Wong

(57) ABSTRACT

Briefly, in accordance with one embodiment, a technique for coding the movement of a head or face from a sequence of images is disclosed. A variety of potential alternative embodiments are discussed.

18 Claims, 2 Drawing Sheets

U.S. PATENT DOCUMENTS

| | | | |
|---|---|---|---|
| 6,236,765 B1 | 5/2001 | Acharya | |
| 6,269,181 B1 | 7/2001 | Acharya | |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,301,370 B1 * | 10/2001 | Steffens et al. | 382/103 |
| 6,301,392 B1 | 10/2001 | Acharya | |
| 6,348,929 B1 | 2/2002 | Acharya et al. | |
| 6,351,555 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,481 B1 | 4/2002 | Tan et al. | |
| 6,377,280 B1 | 4/2002 | Acharya et al. | |
| 6,381,357 B1 | 4/2002 | Tan et al. | |
| 6,392,699 B1 | 5/2002 | Acharya | |
| 6,449,380 B1 | 9/2002 | Acharya et al. | |
| 6,516,093 B1 | 2/2003 | Pardas et al. | |
| 6,535,648 B1 | 3/2003 | Acharya | |

OTHER PUBLICATIONS

Gozde Bozdagi, et al., "Simultaneous 3-D Motion Estimation and Wire-Frame Model Adaptation Including Photometric Effects for Knowledge-Based Video Coding", Electrical and Electronics Eng. Dept., Bilkent University, Ankara, Turkey, 1994 IEEE, pp. 413-416.

Marie Dudon, et al., "Motion Estimation and Triangular Active Mesh", XP 002036860, pp. 47-53.

Haibo Li, et al., "Recursives Estimation of Facial Expression and Movement", Department of Electrical Engineering, Linkoping University, Sweden, 1992 IEEE, pp. 593-596.

Marco La Cascia, et al., "Head Tracking Via Robust Registration in Texture Map Images", Computer Science Department, Boston University, Boston, MA, 1998 IEEE, pp. 508-514.

Acharya, A Memory Based VLSI Architecture for Image Compression, 09/885,415, Jun. 30, 1997.

Acharya et al., A New Scaling Algorithm and Architecture for Integer Scaling in Video, 09/008,131, Jan. 16, 1998.

Acharya, An Integrated Color Interpolation and Color Space Conversion Algorithm from 8-Bit Bayer Pattern RGB Color Space to 12-Bit YCrCb Color Space, 09/034,625, Mar. 4, 1998.

Acharya, A Median Computation-Based Integrated Color Interpolation and Color Space Conversion Methodology from 8-bit Bayer Pattern RGB Color Space to 12-bit YCrCb Color Space, 09/040,806, Mar. 18, 1998.

Acharya, An Integrated Color Interpolation and Color Space Conversion Algorithm From 8-bit Bayer Pattern RGB Color Space to 24-bit CIE XYZ Color Space, 09/048,901, Mar. 26, 1998.

Acharya, A Median Computation-Based Integrated Color Interpolation and Color Space Conversion Methodology from 8-bit Bayer Pattern RGB Color Space to 24-bit CIE XYZ Color Space, 09/050,743, Mar. 30, 1998.

Bawolek et al, Infrared Correction System, 09/126,203, Jul. 30, 1998.

Acharaya, An Efficient Methodology to Select the Quantization Threshold Parameters in a DTW-Based Image Compression Scheme in Order to Store a Predefined Minimm Number of Images into a Fixed Size Secondary Storage, 09/146,159, Sep. 3, 1998.

Pazmino et al, Method of Compressing and/or Decompressing a Data Set Using Significance Mapping, 09/151,336, Sep. 11, 1998.

Tan et al, Reduction of Ringing Artifacts After Decompression of a DWT-Based Compressed Image, 09/165,511, Oct. 2, 1998.

Tan et al, Robust Sequential Approach in Detecting Defective Pixels Within an Image Sensor, 09/191,310, Nov. 13, 1998.

Acharya et al, Color Interpolation for a Four Color Mosaic Pattern, 09/199,836, Nov. 24, 1998.

Acharya, A Mathmatical Model for Gray Scale and Contrast Enhancement of a Digital Image, 09/207,753, Dec. 8, 1998.

Tan et al, Hi-Speed Deterministic Approach in Detecting Defective Pixels Within an Image Sensor, 09/258,636, Feb. 26, 1999.

Acharya, Enhancing Image Compression Performance by Morphological Processing, 09/291,810, Apr. 14, 1999.

Acharya et al., An Edge Enhanced Image Up-Sampling Algorithm Using Discrete Wavelet Transform, 09/292,763, Apr. 14, 1999.

Tan et al., Using an Electronic Camera to Build a File Containing Text, 09/301,753, Apr. 29, 1999.

Tsai et al, Method and Apparatus for Adaptively Sharpening an Image, 09/320,192, May 26, 1999.

Tan et al., Method and Apparatus for Adaptively Sharpening Local Image Content of an Image, 09/328,935, Jun. 9, 1999.

Tan et al, A Hardware Efficient Wavelet-Based Video Compression Scheme, 09/342,863, Jun. 29, 1999.

Tan et al, A Methodology for Color Correction with Noise Regulation, 09/359,831, Jul. 23, 1999.

Acharya et al, Image Processing Method and Apparatus, 09/359,523, Jul. 23, 1999.

Tan et al, Method and Apparatus for Automatic Focusing in an Image Capture System Using Symmetric Fir Filters, 09/383,117, Aug. 25, 1999.

Acharya et al, Square Root Raised Cosine Symmetric Filter for Mobile Telecommunications, 09/429,058, Sep. 2, 1999.

Acharya, Discrete Filter, 09/432,337, Sep. 2, 1999.

Acharya et al, Zerotree Encoding of Wavelet Data, 09/390,255, Sep. 3, 1999.

Acharya et al, A Fuzzy Distinction Based Thresholding Technique for Image Segmentation, 09/393,017, Sep. 10, 1999.

Acharya et al, A Fuzzy Based Thresholding Technique for Image Segmentation, 09/393,136, Sep. 10, 1999.

Acharya, Video Motion Estimation, 09/406,032, Sep. 27, 1999.

Acharya et al, Method of Interpolating Color Pixel Signals from a Subsampled Color Image, 09/410,800, Oct. 1, 1999.

Acharya et al, Method of Compressing a Color Image, 09/411,697, Oct. 1, 1999.

Acharya et al, Indexing Wavelet Compressed Video for Efficient Data Handling, 09/438,091, Nov. 10, 1999.

Miao et al, Dual Mode Filter for Mobile Telecommunications, 09/467,611, Nov. 18, 1999.

Metz et al, Image Processing Architecture, 09/473,643, Nov. 18, 1999.

Acharya, Method of Converting a Sub-Sampled Color Image, 09/461,068, Dec. 14, 1999.

Acharya, Method of Upscaling a Color Image, 09/461,080, Dec. 14, 1999.

Acharya et al, Chip Rate Selectable Square Root Raised Consine Filter for Mobile Telecommunications, 09/467,487, Dec. 20, 1999.

Acharya et al, An Efficient Companding Algorithm Suitable for Color Imaging, 09/482,551, Jan. 13, 2000.

Acharya, A Block-Matching Algorithm for Color Interpolation, 09/494,087, Jan. 28, 2000.

Acharya et al, Method of Quantizing Signal Samples of an Image During Image Compression, 09/507,399, Feb. 18, 2000.

Acharya et al, Method of Inverse Quantizing Quantized Signal Samples of an Image During Image Decompression, 09/507,213, Feb. 18, 2000.

Acharya et al, Method of Integrating a Watermark into an Image, 09/519,874, Mar. 6, 2000.

Acharya et al, Method of Integrating a Watermark into a Compressed Image, 09/519,315, Mar. 6, 2000.

Acharya et al, Method of Using Hue to Interpolate Color Pixel Signals, 09/591,867, Jun. 12, 2000.

Dunton et al, Dual Mode Digital Camera for Video and Still Operation, 09/595,055, Jun. 16, 2000.

Kim et al, Method of Performing Motion Estimation, 09/596,127, Jun. 16, 2000.

Acharya et al, Method of Compressing an Image, 09/597,354, Jun. 19, 2000.

Acharya et al, Model-Based Video Image Coding, 09/608,991, Jun. 30, 2000.

Acharya et al, Method of Video Coding Shoulder Movement From a Sequence of Images, 09/607,724, Jun. 30, 2000.

Acharya et al, Method of Video Coding the Movement of a Human Face from a Sequence of Images, 09/608,989, Jun. 30, 2000.

Schroder K et al: Combined description of shape and motion in an object based coding scheme using curved triangles, (ICIP) IEEE Comp Soc. Press, Us vol. 3, Oct. 23, 1995 pp. 390-393.

Tsuhan Chen et al, A New Frame Interpolations Scheme for Talking Head Sequences, (ICIP) IEEE Comp. Soc. Press, US vol. 3, Oct. 23, 1995, pp. 591-594.

Defu Cai et al, Several Key Problems in Model-Based Image Sequence Compression by Using Interframe AUs Correlation, (ICIP) IEEE Comp. Soc. Press, US, vol. 3 conf. 1, Nov. 13, 1994, pp. 409-413.

Eisert P et al, Rate-distortion-efficient Video Compression Using a 3-D Head Model, (ICIP) Oct. 24, 1999 pp. 217-221.

Bove V M, Object-oriented Television, SMPTE Journal, Scarsdale, N.Y, vol. 104 No. 12, Dec. 1, 1995, pp. 803-807.

Bozdagi, 3-D Motion Estimation and Wireframe Adaptation Including Photometric Effects for Model-Based Coding of Facial Image Sequence, IEEE (transactions on circuits and systems for video technology) vol. 4 No. 3.

Li et al, 3-D Motion Estimation in Model-Based Facial Image Coding, IEEE (transactions on pattern analysis and machine intelligence,)vol. 15 No. 6, Jun. 1993.

Burr D J, Elastic Matching of Line Drawings, IEEE (transactions on pattern analysis and machine intelligence) vol. PAMI-3 No. 6, Nov. 1981.

Choi et al, Analysis and Synthesis of Facial Image Sequences in Model-Based Image Coding, IEEE (transactions on circuits and systems for video technology) vol. 4, No. 3 Jun. 1994.

Yau et al, A Texture Mapping Approach to 3-D Facial Image Synthesis, 6th Annual Euro-Graphics(UK) Conference. Sussex, Apr. 6-8, 1988 Forum 7 pp. 129-134.

Huang et al, Human Facial Feature Extraction for Face Interpretation and Recognition, Pergamon Press Ltd, Pattern Recognition, vol. 25, No. 12, pp. 1435-1444, 1992.

Terzopoulos et al, Constraints on Deformable Models: Recovering 3D Shape and Nonrigid Motion, AAA1 Conference, 1988, pp. 91-123.

Antoszczyszyn, et al., "Local Motion Tracking in Semantic-Based Coding of Videophone Sequences", IPA97, Jul. 15-17, 1997, Conference Publication No. 443, IEE, 1997, pp. 46-50.

Li, et al., "Image Sequence Coding at Very Low Bitrates: A Review", IEEE Transactions on Image Processing, vol. 3, No. 5, Sep. 1994, pp. 589-609.

* cited by examiner

METHOD OF VIDEO CODING THE MOVEMENT OF A HUMAN FACE FROM A SEQUENCE OF IMAGES

RELATED APPLICATIONS

This patent application is related to concurrently filed U.S. patent application Ser. No. 09/608,991, titled "Model-Based Video Image Coding," by Acharya et al., filed on Jun. 30, 2000, and concurrently filed U.S. patent application Ser. No. 09/607,724, titled "Method of Video Coding Shoulder Movement from a Sequence of Images," by Acharya et al., filed on Jun. 30, 2000, both assigned in part to the assignee of the present invention and herein incorporated by reference.

BACKGROUND

The present disclosure is related to video coding and, more particularly, to coding the movement of a head from a sequence of images.

As is well-known, motion estimation is a common or frequently encountered problem in digital video processing. A number of approaches are known and have been employed. One approach, for example, identifies the features located on the object and tracks the features from frame to frame, as described for example in "Two-View Facial Movement Estimation" by H. Li and R. Forchheimer, IEEE Transactions on Circuits and Systems for Video Technology, Vol. 4, No. 3, pp. 276–287, June, 1994. In this approach, the features are tracked from the two-dimensional correspondence between successive frames. From this correspondence, the three-dimensional motion parameters are estimated. Another approach estimates the motion parameters from an optical flow and affine motion model. See, for example, "Analysis and Synthesis of Facial Image Sequences in Model-Based Coding," by C. S. Choi, K. Aizawa, H. Harashima and T. Takeve, IEEE Transactions on Circuits and Systems for Video Technology, Vol. 4, No. 3, pp. 257–275, June, 1994. This optical flow approach estimates the motion parameters without establishing a two-dimensional correspondence. This latter approach, therefore, tends to be more robust and accurate, but imposes a computational load that is heavier typically. A need, therefore, exists for an approach that is more accurate then the two-dimensional correspondence approach, but that is computationally less burdensome than the optical flow and affine motion model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
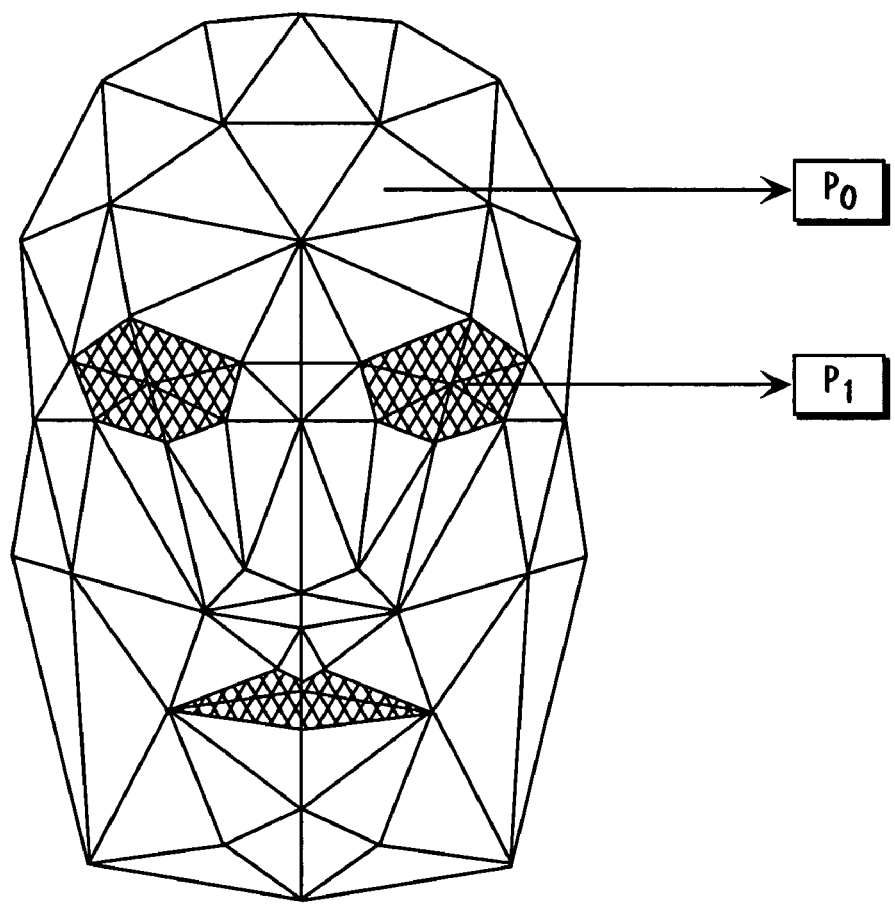
FIG. 1 is a schematic diagram illustrating a three-dimensional (3D) model applied to a human face with planar triangular patches, such as may be employed in an embodiment in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, motion estimation is a common problem in video image processing. However, state of the art techniques such as previously described, for example, suffer from some disadvantages. For example, the previously described technique, referred to here as the "two-dimensional correspondence approach," although computationally less burdensome, seems to be prone to errors due to mismatches of the two-dimensional correspondences. Another approach, referred to here as the "optical flow and affine motion model," such as described in "3-D Motion Estimation and Wireframe Adaptation Including Photometric Effects for Model-Based Coding of Facial Image Sequences", by G. Bozdagi, A. Murat Tekalp and L. Onural, IEEE Transactions on CSVT, Vol. 4, No. 3, pp. 246–256, June 1994, although more accurate and robust, is typically computationally burdensome. Therefore, a need exists for an approach that is more accurate than the former, but less computationally burdensome than the latter.

In this particular context, the motion that is being tracked or coded is the movement of a head or face in a sequence of images. Having the ability to track this motion and coding it may be desirable for a number of reasons. As just a few examples, this may be desirable in video conferencing, where a camera at one end may transmits the appropriate motion or movement of face to a display at the other end. However, the communications channel by which this video conferencing may take place sometimes has a relatively low or limited bandwidth, so that only a limited amount of signal information may be communicated in real-time.

An embodiment of a method of video coding a movement of human head or face from a sequence of images includes the following. A limited number of feature points are selected from an image of the face whose movement is to be video coded. Using at least two images or frames from the sequence, changes in the intensity of selected feature points, such as spatio-temporal rates of change, are estimated. Using the feature points and the estimated rates, translation and rotation parameters of the face are then estimated. The estimated translation and rotation parameters are coded and/or transmitted across the communications channel. It is noted, of course that instead of communicating the coded signal information, it may, alternatively, be stored and read from memory for later use, or used in some other way other than by transmitting it.

Although the invention is not limited in scope in this respect, in this particular embodiment, the face is coded from at least one of the images or frames by employing a three-dimensional (3D) based coding technique to produce what shall be referred to here as a 3D model. Movement of the face from at least two, typically sequential, images of the sequence is estimated using this 3D model of the face or head. In particular, as shall be described in more detail hereinafter, the movement of the face is estimated by treating the 3D model of the head as a rigid body in the sequence of images.

In this embodiment, although the invention is not limited in scope in this respect, the 3D model applied comprises planar triangular patches. This illustrated, for example, in FIG. 1. As FIG. 1 illustrates, these triangular patches, in this particular embodiment in accordance with the invention, are divided into two classes, one class in which local motion is more significant, such as, for example, the triangular patches covering eyes, eyebrows, or mouth, denoted here •$_l$, and one class in which global motion is more significant, denoted here by the •$_g$. FIG. 1 illustrates the two classes of triangles, the shaded of triangles belonging to •$_l$ and unshaded triangles belonging to •$_g$.

In this embodiment, a limited number of feature points are selected from an image of the head. In this embodiment, enough feature points are selected from different triangular patches to obtain the desired amount of accuracy or robustness without being computationally burdensome. Furthermore, a weighting factor is assigned to each feature point, depending upon the class of triangular patch to which it belongs. The weighting factor assigned to a feature point selected from the i$^{th}$ triangular patch is given by the following relationship.

$$W_{pi} = \begin{cases} W_g, & \text{for all } i \in *_g \\ W_l, & \text{for all } i \in *_l \end{cases}$$

where $W_g$ is greater than $W_l$.

The weighting factors are used in the Least Mean Square estimation of the global motion parameters in this particular embodiment, as described in more detail later, and there, the facial regions contributing more to the global motion have more weighting factors than the ones predominantly contributing to local motion; however, the invention is not restricted in scope to this embodiment. For example, other estimation approaches other than Least Mean Square may be employed and other approaches to employing weighting may be employed, or, alternatively, weighting may not necessarily be employed in alternative embodiments. For this embodiment, the range of the weighting factors were determined from experimentation, although, again, the invention is not restricted in scope to this particular range of weights. Here, nonetheless, $W_g$ varies in the range of approximately 0.6 to approximately 0.9 and $W_l$ varies in the range of approximately 0.3 to approximately 0.1.

Once feature points are selected, the rate of change of intensity of the selected feature points is estimated from the sequence of images. It is noted that it takes at least two images to estimate a rate of change; however, in this embodiment a rate of change is calculated for each pair of immediately sequential images in the sequence. It is also noted that a distinguishing feature of this approach is the selection of a limited number of feature points, thereby reducing the computational burden of this approach.

The relationship between rate of change in intensity at the selected feature points and estimating the translation and rotation of the face is as follows. The gradient between two consecutive or immediately sequential frames is described as follows.

$$I_{XK} V_{XK} + I_{YK} V_{YK} + I_{TK} = 0 \tag{1}$$

where $I_{XK}$, $I_{YK}$, and $I_{TK}$ are the rates of change at a selected pixel between the two frames k and (k+1) in the x-, y- and the temporal directions respectively and $V_{XK}$, $V_{YK}$ are optical flow fields in the x and y directions, respectively. The $I_{XK}$ and $I_{YK}$ are determined by the intensity gradients of the neighboring pixels in the same frame and $I_{TK}$ is measured from the intensity gradient at substantially the same spatial position between consecutive frames. The equation is based on an assumption of brightness constancy for moving objects in the successive frames.

Likewise, the formula for small motion of a rigid body is given by the following equation.

$$V = R P + T \tag{2}$$

where P is a three-dimensional position vector, vector V represents the velocity of a point on the rigid body, matrix R represents the angular velocity, and vector T represents the translation of the rigid body. R, the angular velocity, is given by the following 3-by-3 matrix $$R = \begin{matrix} r_{11} & r_{12} & r_{13} \\ r_{21} & r_{22} & r_{23} \\ r_{31} & r_{32} & r_{33} \end{matrix}$$

where $r_{11} = c_\alpha c_\beta - 1$, $r_{12} = c_\alpha s_\beta s_\gamma - s_\alpha c_\gamma$, $r_{13} = c_\alpha s_\beta c_\gamma - c_\alpha s_\gamma$, $r_{21} = s_\alpha s_\beta$, $r_{22} = s_\alpha s_\beta s_\gamma c_\alpha c_\gamma - 1$, $r_{23} = s_\alpha s_\beta c_\gamma - c_\alpha s_\gamma$, $r_{31} = -s_\beta$, $r_{32} = c_\beta s_\gamma$, $r_{33} = c_\beta c_\gamma - 1$ and $\alpha$, $\beta$, and $Y$ are rotations about x, y, and z axes, respectively, and c and s denote the cosine and the sine of the angles.

Under the assumption of orthographic projection of the human face, for this particular embodiment, $V_{XK}$ and $V_{YK}$ are considered to be the optical flow fields with the z-diectional component assumed to be zero. The following linearized estimation equation may, therefore, be derived from equation (2) above by equating the x- and the y-directional components of the velocities and then using these relations in equation (1) to evaluate $I_{TK}$ as $$H_K = F_K A$$

where $H_K$ is $-I_{TK}$, A is $[r_{11}\ r_{12}\ r_{13}\ r_{21}\ r_{22}\ r_{23} T_x T_y]$, and $F_K$ is $[x_k I_{xk}\ y_k I_{xk}\ z_k I_{xk}\ x_k I_{yk}\ y_k I_{yk}\ z_k I_{yk}\ I_{xk}\ I_{yk}]$ The global estimation parameters, here, the translation and rotation signal information, may be obtained by solving the previous equation using a Least Mean Square approach, although, of course, the invention is not limited in scope in this respect, and other approaches, such as least absolute value, may be employed. This is done for each feature point and then the values for a rotation and translation that give the least overall mean square error are employed, again, for this particular embodiment.

Figure 2:
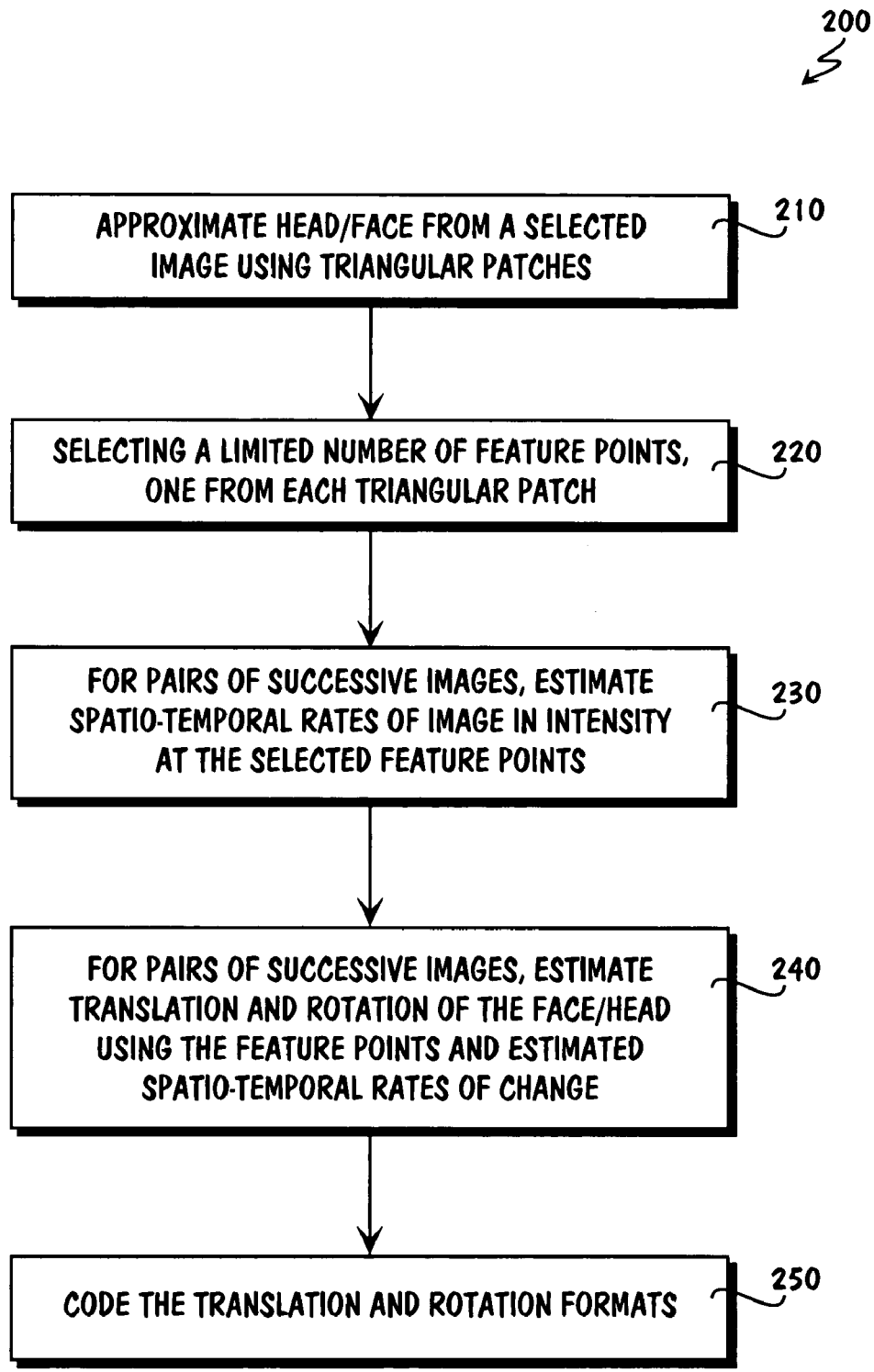
FIG. 2 is a flowchart of an embodiment in accordance with the present invention.

FIG. 2 is a flowchart illustrating an embodiment 200 of a method of video coding the movement of a human face from a sequence of images in accordance with the invention, although, of course, this is just one example of an embodiment, and many others are possible within the scope of the present invention. At block 210, the face or head from a particular or selected image is approximated using triangular patches, such as illustrated, for example, in FIG. 1. At block, 220, a limited number of feature points on the face are selected, in this particular embodiment, one feature point from each triangular patch, although, of course, the invention is not limited in scope in this respect. At block 230, for each pair of successive images or frames in the sequence of images, spatio-temporal rates of change in intensity at the selected feature points are estimated. At block 240, estimates of translation and rotation for the face are made using the feature points and the estimated spatio-temporal rates of change for each pair of successive images in this particular embodiment. At block 250, these estimates are then coded and transmitted across a transmission medium or communications channel so that at the far end, the estimates may be employed to reproduce or represent movement of a representation of the face.

It will, of course, be understood that, although particular embodiments have just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a host computer or computing system or platform, or an imaging system, may result in a method of video coding the movement of a human face from a sequence of images in accordance with the invention, such as, for example, one of the embodiments previously described. Likewise, a hardware embodiment may comprise an imaging system including an imager and a computing platform, such as one adapted to perform or execute coding in accordance with the invention, for example.

While certain features of the invention have been illustrated and detailed herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of video coding the movement of a face from a sequence of images comprising:
   selecting a limited number of feature points from an image of the face where minimal or no local motion is observed to be video coded;
   estimating spatio-temporal rates of change in intensity at the selected feature points using at least two images from the sequence;
   estimating the translation and rotation of the face using the feature points and using the estimated spatio-temporal rates; and
   coding the estimated translation and rotation.

2. The method of claim 1, wherein prior to selecting the feature points, for a particular image, the face is approximated using triangular planar patches.

3. The method of claim 2, wherein a feature point is selected from each planar triangular patch.

4. The method of claim 1, wherein the translation and rotation of the face are estimated from the feature points and from the estimated spatio-temporal rates using a least mean square estimation method.

5. A method of video coding the movement of a head from a sequence of images comprising:
   coding the head from at least one of the images based, at least in part, on a limited number of selected feature points from an image of the head where minimal or no local motion is observed, employing a three-dimensional based coding technique to produce a three-dimensional (3D) model; and
   estimating the movement of the head in other images of the sequence using the 3D model of the head, wherein the movement of the head is estimated as translations and rotations based at least in part on estimates of spatio-temporal rates of change in intensity at the selected feature points.

6. The method of claim 5, wherein the movement of the head is estimated by treating the 3D model of the head as a rigid body in the sequence of images.

7. A system comprising:
   an imager; and a computing platform;
   said imager and computing platform being coupled to communicate electronically;
   wherein said computing platform being adapted so that, in operation, the movement of a face from a sequence of images is coded by:
   selecting a limited number of feature points from an image of the face where minimal or no local motion is observed to be video coded;
   estimating spatio-temporal rates of change in intensity at the selected feature points using at least two images from the sequence;
   estimating the translation and rotation of the face using the feature points and using the estimated spatio-temporal rates; and
   coding the estimated translation and rotation.

8. The system of claim 7, wherein said computing platform is adapted so that, in operation, the movement of a face from a sequence of images is further coded by, prior to selecting the feature points, for a particular image, approximating the face using triangular planar patches.

9. The system of claim 8, wherein said computing platform is adapted so that, in operation, the movement of a face from a sequence of images is further coded by selecting a feature point from each planar triangular patch.

10. The system of claim 7, wherein said computing platform is adapted so that, in operation, the movement of a face from a sequence of images is further coded by estimating the translation and rotation of the face from the feature points and from the estimated spatio-temporal rates using a least mean square estimation method.

11. A system comprising:
   an imager; and a computing platform;
   said imager and computing platform being coupled to communicate electronically;
   wherein said computing platform being adapted so that, in operation, the movement of a head from a sequence of images is represented by:
   coding the head from at least one of the images based, at least in part, on a limited number of selected feature points from an image of the head where minimal or no local motion is observed, employing a three-dimensional based coding technique to produce a three-dimensional (3D) model; and
   estimating the movement of the head in other images of the sequence using the 3D model of the head, wherein said computing platform is adapted so that, in operation, the movement of the head is estimated as translations and rotations based at least in part on estimates of spatio-temporal rates of change in intensity at the selected feature points.

12. The system of claim 11, wherein said computing platform is adapted so that, in operation, the movement of the head in other images of the sequence is estimated by treating the 3D model of the head as a rigid body in the sequence of images.

13. An article comprising: a storage medium, said storage medium having stored thereon instructions, said instructions, when executed by a computing platform, resulting in the movement of a face from a sequence of images being coded by:
   selecting a limited number of feature points from an image of the face where minimal or no local motion is observed to be video coded;

estimating spatio-temporal rates of change in intensity at the selected feature points using at least two images from the sequence;

estimating the translation and rotation of the face using the feature points and using the estimated spatio-temporal rates; and coding the estimated translation and rotation.

14. The article of claim 13, wherein said instructions, when executed, further result in, prior to selecting the feature points, for a particular image, approximating the face using triangular planar patches.

15. The article of claim 14, wherein said instructions, when executed, further result in selecting a feature point from each planar triangular patch.

16. The article of claim 13, wherein said instructions, when executed, further result in, estimating the translation and rotation of the face from the feature points and from the estimated spatio-temporal rates using a least mean square estimation method.

17. An article comprising: a storage medium, said storage medium having stored thereon instructions, said instructions, when executed by a computing platform, result in the movement of a head from a sequence of images being represented by:

coding the head from at least one of the images based, at least in part, on a limited number of selected feature points from an image of the head where minimal or no local motion is observed, employing a three-dimensional based coding technique to produce a three-dimensional (3D) model; and estimating the movement of the head in other images of the sequence using the 3D model of the head, wherein said instructions, when executed, result in the movement of the head being estimated as translations and rotations based at least in part on estimates of spatio-temporal rates of change in intensity at the selected feature points.

18. The article of claim 17, wherein said instructions, when executed, further result in the the movement of the head in other images of the sequence being estimated by treating the 3D model of the head as a rigid body in the sequence of images.

* * * * *